United States Patent [19]

Casey

[11] 4,399,769
[45] Aug. 23, 1983

[54] PROCEDURES FOR RAISING FISH

[76] Inventor: Robert F. Casey, 22 Duggan Rd., Acton, Mass. 01720

[21] Appl. No.: 268,903

[22] Filed: Jun. 1, 1981

Related U.S. Application Data

[60] Continuation-in-part of Ser. No. 162,407, Jun. 24, 1980, abandoned, which is a division of Ser. No. 847,098, Feb. 1, 1978, Pat. No. 4,221,187.

[51] Int. Cl.$^3$ .................................. A01K 61/00
[52] U.S. Cl. ........................................ 119/3
[58] Field of Search ........................ 119/2, 3, 4, 5

[56] References Cited

U.S. PATENT DOCUMENTS

| | | | |
|---|---|---|---|
| 518,319 | 4/1894 | Hoxsie | 119/3 |
| 2,725,356 | 11/1955 | Lombardi | 119/5 X |
| 3,116,712 | 1/1964 | Ogden et al. | 119/3 |
| 3,166,043 | 1/1965 | Castillo | 119/3 |
| 3,245,420 | 4/1966 | Cherney | 134/101 |
| 3,870,018 | 3/1975 | Fruchtnicht | 119/3 |
| 3,996,893 | 12/1976 | Buss | 119/3 |
| 4,094,788 | 6/1978 | Dockery | 119/5 X |
| 4,198,924 | 4/1980 | Chapman | 119/51 R |
| 4,297,973 | 11/1981 | Knowles | 119/3 |

*Primary Examiner*—Hugh R. Chamblee
*Attorney, Agent, or Firm*—Hamilton, Brook, Smith & Reynolds

[57] ABSTRACT

A procedure for feeding fish, such as rainbow trout, in a tank is disclosed. This procedure utilizes a suction sweeper on the bottom of the tank. By administering a predetermined amount of food to the tank and measuring how much food is not eaten by the fish, it is possible to reduce the amount of excess food. In addition, by cleaning the tank immediately prior to feeding and prompt recovery of the excess food, it is possible to recycle excess food without suffering from contamination, bacterial degradation or other unhealthy effects.

3 Claims, 7 Drawing Figures

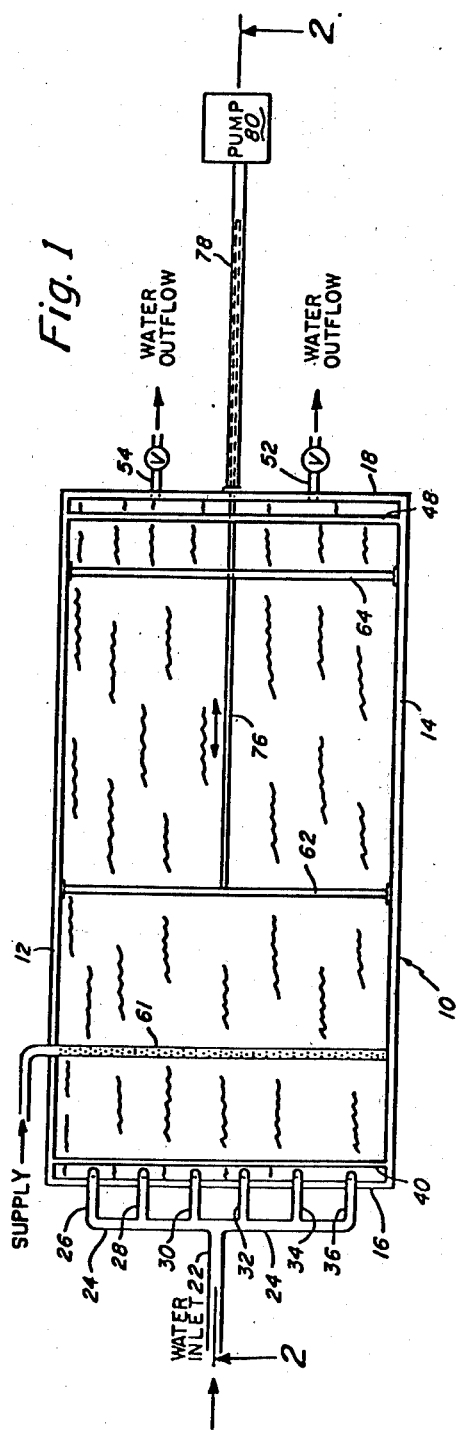
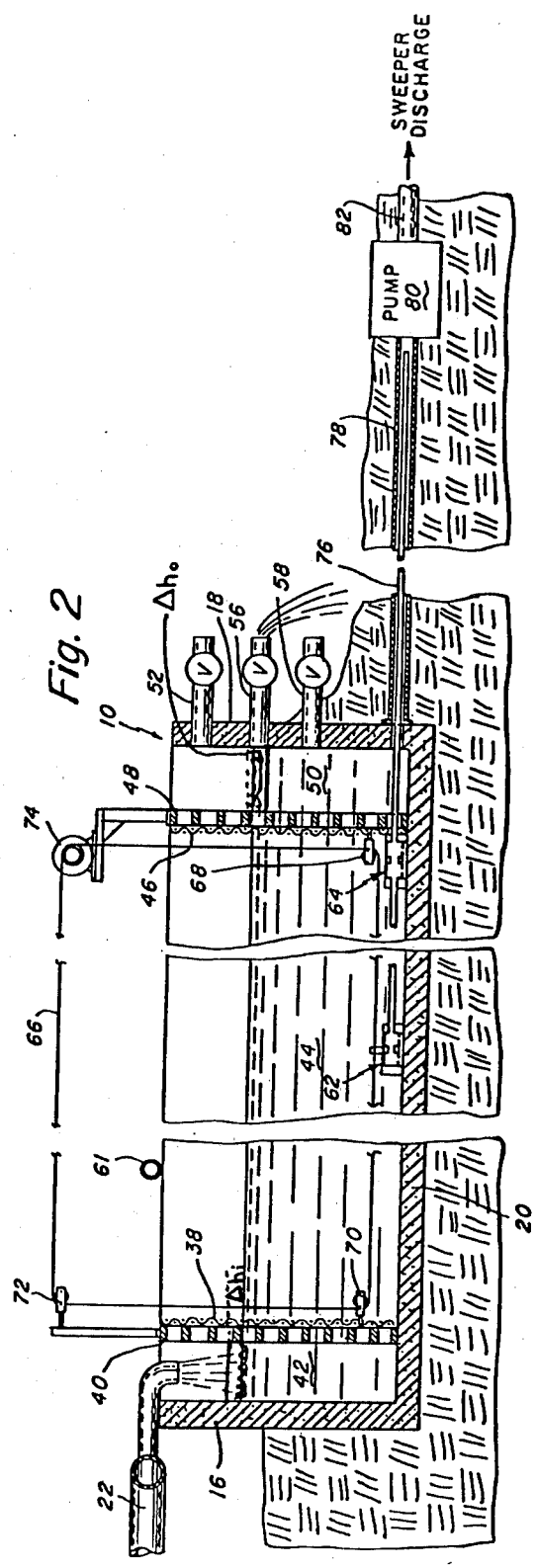

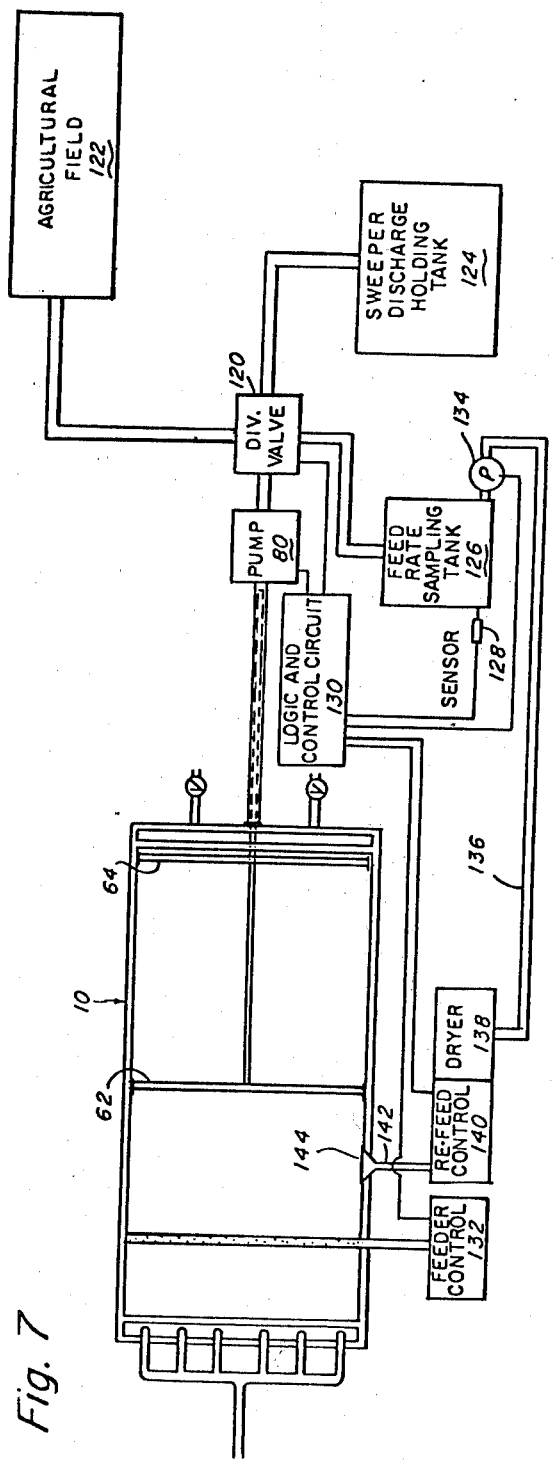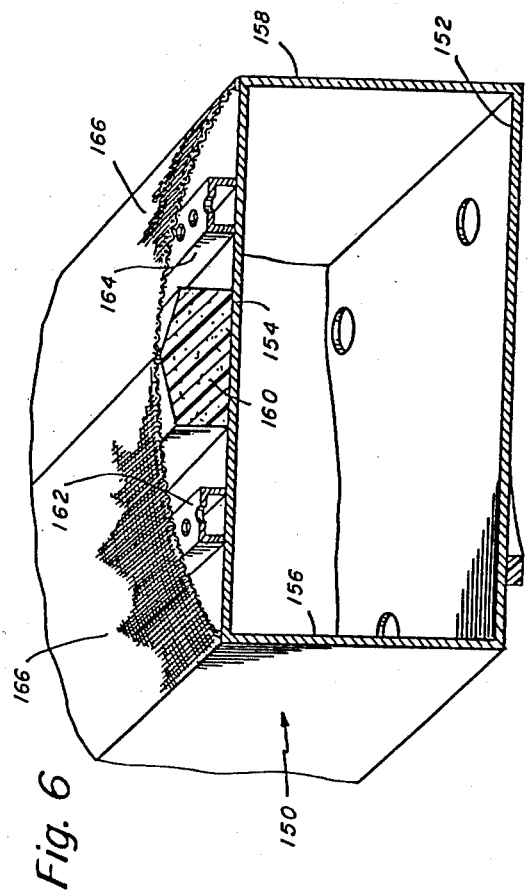

PROCEDURES FOR RAISING FISH

DESCRIPTION

Related Applications

This application is a continuation-in-part of U.S. Ser. No. 162,407, filed on June 24, 1980, now abandoned, which was a divisional of U.S. Ser. No. 847,098, filed on Feb. 1, 1978, now U.S. Pat. No. 4,221,187.

TECHNICAL FIELD

This invention is in the field of fish husbandry.

BACKGROUND ART

There have been many attempts to raise fish in large quantities for the commercial market. In order to successfully accomplish this, however, very careful control over the certain parameters is required.

For example, the oxygen content of the water used to raise fish is extremely critical. If the oxygen level drops below a minimum level, fish will die. Usually, this minimum level is not far below the saturation level at the temperature of the water employed, which means that any significant depletion of the oxygen present will lower the level below that required.

Water temperature is also crucial. Rainbow trout, for example, seem to grow best at a temperature around the mid-50's (°F.). If the water temperature is raised too far above this value, disease becomes more prevalent. On the other hand, if the temperature is dropped too much below this value, the fish simply do not grow at a rapid enough rate to make the venture commercially viable.

Another serious problem is the accumulation of particulate matter at the bottom of a fish tank, expecially metabolic waste and excess food. Accumulated metabolic waste tends to contaminate the water with its by-products, including ammonia, urea, and other compounds which are toxic for fish at relatively low levels. Leaching of toxic compounds from metabolic waste is aggravated if the waste is subjected to agitation, such as is the case if the water flow in the fish tanks is too rapid or too turbulent.

Food is another variable in fish raising which must be carefully controlled. Food is, of course, expensive and overfeeding tends to take away from the commercial viability of the venture. This is particularly true with many commercial species of fish, such as salmonids, which are principally mid-water feeders. In addition, excess food accumulation also depletes oxygen since oxygen in the water is consumed in the decomposition of excess food. Excess food is simply wasted, consumes oxygen, adds inordinate expense and contributes to disease.

On the other hand, underfeeding is also a problem since it results in a slower growth rate which detracts from the commercial viability of fish raising. Thus, it is extremely important in the commercial raising of fish to provide precisely the proper amount of food, and no more or no less.

Both raceways and tanks have been developed and employed in attempts to raise fish commercially. Raceways are elongated shallow channels through which vast quantities of water are flowed. Raceways provide little or no control, however, over the important variables, and so, their use has been limited to situations in which there is a natural supply of water which just happens to be right for raising fish. Thus, raceways are often employed near mountain streams having water at an appropriate temperature for fish raising.

A variety of tank systems have been designed in attempts to control one or more of these important parameters, and some of these are described in the patent literature. One example, described in U.S. Pat. No. 3,565,043, discloses a fish husbandry system which has an upper fish habitat compartment, with a water supply spray, and a lower control compartment separated by a slanted partition to guide waste matter and pollutants through an adjustable flow hole into the lower compartment. U.S. Pat. No. 3,583,365 describes an apparatus useful in concentrating live fish in a container for transfer to another location. U.S. Pat. No. 3,661,119 discloses a fish larvae rearing tank with a water circulation system for rapidly exchanging the water in the tank which is characterized by the fact that it produces minimum turbulence and air bubbles. U.S. Pat. No. 3,756,197 discloses a generally vertical, waterfilled tank into which oxygen-containing gas is injected under pressure to a hood section which retains the oxygen so that it can be dissolved into the water. U.S. Pat. No. 3,771,492 discloses a system for handling large quantities of water, obtained from wells or springs, which is used to raise fish and which is subsequently returned into the earth.

Another fish raising tank that has been employed has a circular cross-section at its upper portion with sloping walls at its lower portion. The sloping walls are intended to create a whirlpool motion to water flowing through this tank in an effort to entrain particulate material and carry it out of the tank. This shape doesn't approximate a natural fish habitat, however, and has resulted in bunching of fish and an uneven distribution. The swirling action of water in such tanks also tends to agitate particulate matter, including metabolic waste, and this produces a leaching of toxic products which is highly undesirable. In addition, tanks of this type, or any other design requiring the action of rapidly flowing water to remove accumulated particulate matter, requires the flow of vast quantities of water which can create a severe environmental problem.

Applicant's parent application, which issued on Sept. 9, 1980, as U.S. Pat. No. 4,221,187, disclosed a different type of tank apparatus designed for commercial raising of fish. The main tank may be of virtually any size, depending upon the number of fish contained; for example, suitable dimensions might be a rectangular tank 80 ft. long×40 ft. wide×7 ft. deep. Water is introduced into one end of the fish tank using means for initiating laminar flow. Laminar flow requires the fish to expend only minimum exertion swimming and, yet, eliminates the creation of pockets of non-circulating water. Laminar flow also reduces the quantity of water required compared to other tank or raceway designs.

A particularly unique feature of this apparatus is the sweeper apparatus which is employed. This sweeper apparatus has one or more sweeper heads slidably mounted at the bottom of the tank so that they can move longitudinally across the surface of the tank bottom. The sweeper head assembly is attached to a pump which draws a relatively small quantity of water into the sweeper head and from the tank. This small quantity of water is sufficient to entrain particulate matter which has accumulated at the tank bottom.

The main purpose of this sweeper is to clean particulate matter, such as metabolic waste products and excess food, which has accumulated at the bottom of the fish tank. In addition, the sweeper may be provided with means to introduce oxygen into the tank as well as means to introduce a disinfectant, such as chlorine gas. Although chlorine is highly toxic, the unique sweeper design allows it to be used without contaminating the bulk of the tank.

Water picked up by the sweeper is pumped through an exit line. In previous tank embodiments that did not contain sweeping devices, effluent water containing fish waste and excess food was distributed over a ground area for agricultural purposes, or otherwise disposed of as cheaply as possible. However, the sweeping apparatus disclosed in the parent application, now U.S. Pat. No. 4,221,187, allows for a variety of useful procedures to analyze and reuse the particulate material removed from fish tanks.

DISCLOSURE OF THE INVENTION

This invention relates to procedures for using a tank apparatus for commercial raising of fish that is equipped with a sweeper apparatus. By operation of the sweeper apparatus, particulate material such as uneaten food and metabolic waste may be removed from a tank that contains fish. This material, which is entrained in water, is removed from the tank through an exit line connected to the sweeper head assembly. It may be used for any of several purposes, including the following.

First, uneaten food may be analyzed to determine the proper amount of food that should be fed to a tank of fish. This may be done by sweeping the tank to remove fish waste and uneaten food, then administering a known quantity of food to the tank. Uneaten food will settle to the bottom, and may be removed by the sweeper. This food is analyzed to determine what portion of the food administered to the tank was not eaten. The amount of food fed to the fish may be adjusted accordingly.

In addition, uneaten food may be recovered by use of the sweeper, processed in any way desired, and read-ministered to a tank of fish. This type of recycling operation prevents food from being wasted, even if excess food is administered to a tank of fish.

In addition, the method of this invention may be used to scientifically analyze the effect of virtually any factor upon the feeding and growth of fish. Since the effluent of an organism or society contains potentially valuable information about the organism or society, this procedure will greatly enhance the scientific analysis of fish feeding and growth.

BRIEF DESCRIPTION OF THE DRAWINGS

FIG. 1 is a top view of a main fish tank according to this invention;

FIG. 2 is a cross-sectional elevational view of the main fish tank of FIG. 1;

FIG. 6 is a perspective view of an alternative embodiment for a sweeper head; and, FIG. 7 is a schematic view of the overall fish raising system of this invention.

BEST MODE OF CARRYING OUT THE INVENTION

Figure 3:
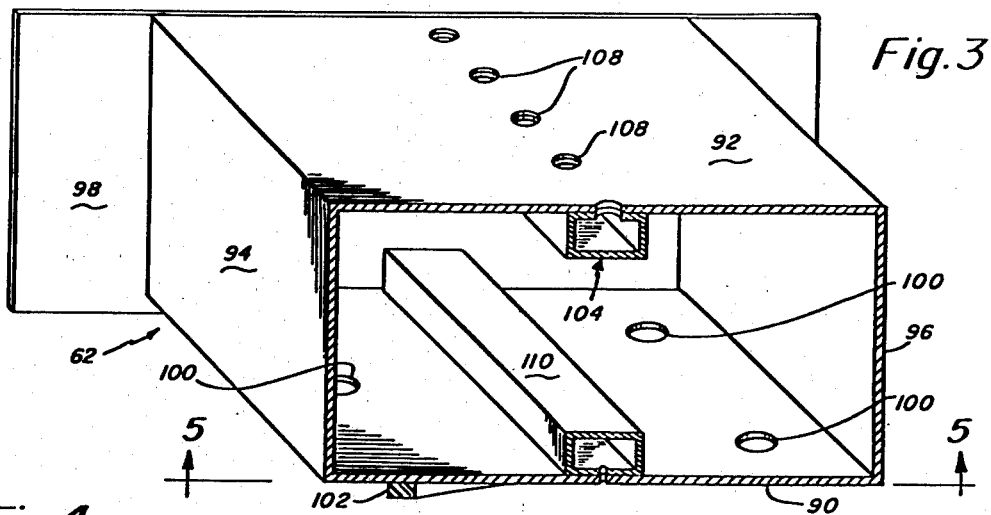
FIG. 3 is an exploded cross-sectional view of a sweeper, according to this invention.

The apparatus and procedures for carrying out this invention will now be further described in more detail with reference to the Figures.

FIGS. 1 and 2 illustrate a main fish tank 10 with its accompanying water inlet and outlet connections and a dual sweeper apparatus for cleaning particulate matter from the tank bottom. Therein, it can be seen that main fish tank 10 is a rectangular tank formed from planar side walls 12 and 14; planar end walls 16 and 18; and planar bottom 20. Other shapes could also be employed, of course. The exact dimensions can also vary over a wide range, but an example of a suitable rectangular tank would be one with dimensions of 80 ft×40 ft×7 ft, which would be suitable for raising rainbow trout in high densities. Suitable tanks can be constructed from a variety of materials including metals, plastics, concrete, or a combination. It is preferred to provide smooth surfaces on the inside of walls 12, 14, 16 and 18 and also on the inside of bottom 20.

Water is introduced through water inlet pipe 22. Water flows from inlet pipe 22 into header 24 and is distributed through a series of smaller pipes 26, 28, 30, 32, 34 and 36, which empty into the top of the inlet end of tank 10. Water is introduced into tank 10 at a rate suitable for maintaining laminar flow in the tank as well as one which meets the demands of the fish, such as one which provides a sufficient initial oxygen level.

Very fine meshed screen 38 is positioned on support 40 at a short distance (e.g., 1½ feet on 80' tank) from inlet end wall 16. An example of suitable screen material is the forming fabric manufactured by Huyck Corp. for use in papermaking. The purpose of screen 38 is to establish laminar flow in tank 10, which means that the mesh of the screen should be very fine so that it causes a slight head of water to build up in the inlet reservoir 42. This head, which is exaggerated on FIG. 2 for purposes of illustration, is represented by $\Delta h_i$, and is equal to the difference in height between the surface of water in reservoir 42 and the surface of water in fish growth volume 44. At any height h on screen 38, therefore, the pressure on the reservoir 42 side is $h + \Delta h_i$, whereas the pressure on the other side is h, which yields a constant differential pressure across screen 38 of $\Delta h_i$. This uniform pressure differential over the entire surface of screen 38 produces laminar flow at the inlet end of tank 10. The rectangular shape of tank 10 is useful in maintaining this laminar flow through the water flow path.

At the exit end of tank 10, there is another screen 46, on support 48, which serves to minimize any disturbance of laminar flow at the exit end. Screen 46 may be made from the same screen material as screen 38, or it may be different. In any event, screen 46 serves to create a uniform differential pressure head, equal to $\Delta h_o$, at any height between water in fish volume 44 and water in outlet reservoir 40. This, of course, is the inverse of the situation at the inlet end. Again, for purposes of illustration, the pressure differential $\Delta h_o$ is exaggerated on FIG. 2.

Flowing water can exit from tank 10 through a series of outlet pipes, such as outlet pipes 52, 54, 56 and 58. Each has a corresponding outlet valve. As illustrated, the outlet pipes are arranged at different vertical heights to allow adjustment of the water level in tank 10. Water leaving tank 10 can be reused, of course, such as by recirculating it through a biological filter.

Means for introducing fish food are employed, such as the pneumatic feeder system shown which comprises a pneumatic system feed line 60 and feed distributor pipe 61. The pneumatic feeder blows feed across the surface of water within the tank. It is preferable to spread the feed over a large surface area so that all fish in tank 10 can have equal opportunity to feed. Therefore, a plurality of feed outlets could be used, as well as other systems, including mechanical or hydraulic systems. Examples of pneumatic fish feeding systems are described in detail in U.S. Pat. Nos. 3,526,210 and 3,786,784, the teachings of which are incorporated by reference.

The sweeper apparatus employed at the bottom of tank 10 has two sweeper heads, 62 and 64, which are connected so that they move in unison and, in combination, are able to sweep the entire tank bottom. They are driven in a slidable manner along the bottom surface of tank 10 by flexible drive line 66 connected by guide pullies 68, 70 and 72 to electric motor 74. Water containing entrained particulate matter is sucked from the bottom of the tank into either of sweeper heads 62 and 64 and transported by smaller conduit 76 which is slidably mounted within larger fixed conduit 78. Water and entrained material empty from smaller conduit 76 into larger conduit 78 which is connected to pump 80 which discharges material from the sweeper heads 62 and 64 into discharge line 82.

Figure 4:
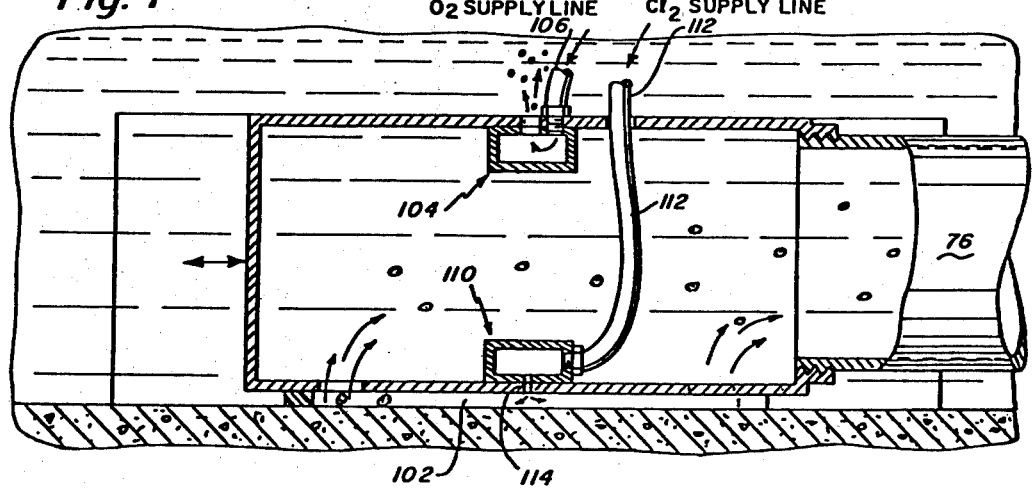
FIG. 4 is a side elevational view of the sweeper of FIG. 3.
Figure 5:
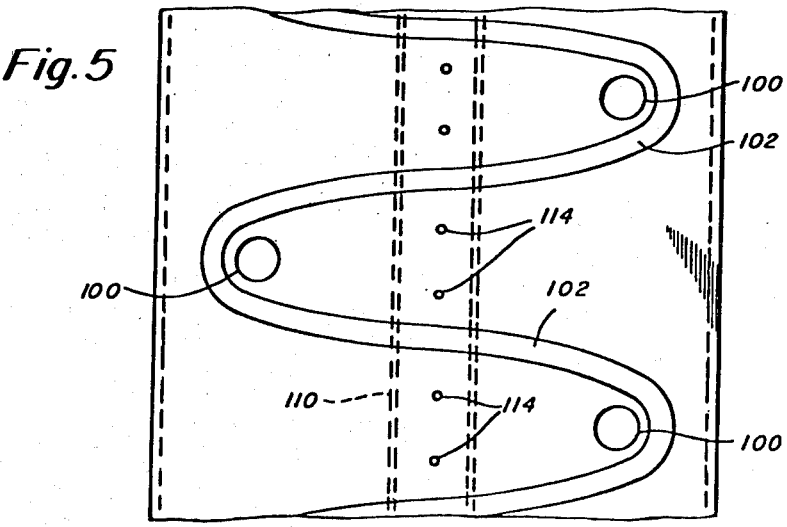
FIG. 5 is a view of the bottom of the sweeper of FIGS. 3 and 4.

The details of the construction of sweeper head 62 can be seen by referring to FIGS. 3-5. Therein, it can be seen that this sweeper head 62 has a general rectangular shape formed from bottom wall member 90, top wall member 92, and two side wall members 94, 96. Planar slide member 98 is attached at one end and serves to cover the end as well as to assist the sweeper head in maintaining proper alignment as it slides along the tank bottom. The bottom wall member contains a series of spaced holes 100 therein through which water is sucked from the bottom of the tank—this water carries entrained particulate matter with it. Holes 100 are spaced in a pattern to maximize coverage of the bottom surface as the sweeper head traverses back and forth. Sinusoidal shaped spacer 102 helps in directing water and entrained material towards the holes 100 as the sweeper head moves in either direction. Spacer 102 also slightly elevates the lower wall 90 of the sweeper head 62 from the tank bottom.

As sweeper head 62 traverses back and forth along the bottom surface of tank 10, it sucks up sufficient water to entrain particulate matter accumulated at the tank bottom. The quantity of water entering sweeper head 62 is small, of course, compared to the volume used in systems depending upon a flushing action to clean tanks or raceways. Typically, the ratio of water flowing through tank 10 to that sucked up by sweeper heads 62 and 64 would range from 10/1 to 100/1.

Water and entrained particulate material are pumped through smaller conduit 76 into larger conduit 78, and from conduit 78 to sweeper discharge line 82. Smaller conduit 76 is attached to side wall 96 via a standard screw-type pipe coupling.

Because smaller conduit 76 is slidably mounted within larger conduit 78, pump 80 can be mounted in a permanent position. Of course, it is also possible to use other arrangements to transport water and entrained particulate matter from the sweeper heads, including a slidable pump connected to one slidable conduit extending from the sweeper heads.

It can also be seen that a small channel 104 is attached to and runs along the inner surface of top wall member 92. This channel is connected to a supply line 106 for oxygen or an oxygen-containing gas such as air. Thus, oxygen can be introduced into channel 104 and distributed through a series of smaller holes 108 extending through the top of sweeper head 62, if the oxygen level in the water drops below the level desired to maintain good growth of fish.

It is also possible to introduce an auxiliary or emergency supply of oxygen through recessed channels in the tank bottom. This would normally be a problem because the accumulation of particulate matter would cause clogging, etc., but the sweeper means described herein will overcome these problems.

A second channel 110 is located on the inner surface of bottom wall member 90 which is connected to a supply line 112 of chlorine gas and provided with holes 114. This can be used to disinfect the bottom of the tank and kill microorganisms which have built up there and might lead to disease in the fish. Although chlorine is toxic to fish, it can be used in this system because it is maintained locally beneath the surface of sweeper head 62 and never has an opportunity to reach the fish growing volume 44.

The sweeper can be formed from many materials and is preferably formed from a material which is resistant to corrosion, such as aluminum or plastics.

FIG. 6 illustrates an alternative sweeper head construction. Thus, sweeper head 150 has a generally rectangular shape formed from bottom wall 152, top wall 154, and side walls 156 and 158. Support 160 is positioned at the outside center of top wall 154 and serves two purposes. The first purpose is that of adding buoyancy to sweeper head 150 which is achieved since support 160 can be formed from a formed from a foamed polymer, or other materials, which have good buoyancy in water. The size and shape of support 160 can be adjusted to provide as much buoyancy as desired, of course.

The second purpose for support 160 relates to the retention and diffusion of oxygen-containing gas released from channels 162 and 164. As illustrated, fabric or mesh envelopes 166 are fastened at the sides of sweeper head 150 and onto support 160 so as to provide two oxygen-containing and diffusing chambers. These assist greatly in dissolving oxygen in the water so that the fish can use it. Of course, there may be only one chamber, or for that matter, more than two, and these can have a wide variety of designs.

FIG. 7 illustrates a schematic view of an overall fish husbandry system including a fish tank as described above. Metabolic waste products and excess food sucked up by the sweeper heads 62 and 64 can be pumped to a number of locations through divertor valve 120. If it is desired to simply dispose of these products, divertor valve 120 can be directed to dispose of the output from pump 80 to a disposal area, such as agricultural field 122. Alternatively, divertor valve 120 can be positioned to direct outflow from pump 80 to a large waste holding tank 124. Although not shown, the pump output could also be returned into the ground below the frost level in winter.

Still another option is to position divertor valve 120 to direct pump effluent to feed rate sampling tank 126. Feed rate sampling tank 126 can be used to determine whether the proper amount of feed is being added to fish tank 10. It is very difficult to accurately measure the number of fish within the tank, and therefore, to gauge how much feed should be added. With this system, the tank can be swept clean of particulate matter on the bottom by sweeper heads 62 and 64. Immediately thereafter, feed can be added in a predetermined amount which is an estimate of that required. Since rainbow trout and other salmonids are principally mid-water feeders, excess feed not consumed by the fish will fall to the bottom of the tank. Therefore, if the tank is swept shortly after feeding, the amount of feed picked up by sweeper heads 62 and 64 will be an accurate measure of the excess feed introduced.

Thus, excess food picked up by sweeper heads 62 and 64 is pumped through divertor valve 120 which is positioned to transport this to feed rate sampling tank 126. A sensor 128, which might be an optical sensor, for example, senses the amount of food which was not consumed by the fish. Sensor 128 transmits a signal to logic and control circuit 130 which then transmits an appropriate signal to feeder control 132 to adjust the amount of food introduced in the next feeding.

Presumably, the amount of food that is fed to a tank of fish might be reduced by an amount equal to the amount of uneaten food that settles to the bottom. However, experimental work is needed to determine whether this is in fact the optimal situation. It may be that a slight excess of food should be applied to a tank of fish, to optimize the economic operation of the tank.

In addition to reducing the amount of excess food that is administered to a tank of fish, it is possible to use the apparatus described herein to recover uneaten food from the tank and readminister it to the tank. An auxiliary pump 134 can be used to empty sampling tank 126 by pumping the contents thereof to dryer 138. Dried food is then reintroduced into tank 10 through re-feed controller 140, re-feed supply line 142 and feeder outlet 144. It is not necessary to spread the recycled food, which will normally be only a small amount, over a wide surface area. It also may not be necessary to dry this recycled feed, which may be introduced wet by a hydraulic recycle system. It is possible to process recovered food in any way desired prior to readministering it to a tank of fish.

By appropriate timing of the feeding and sweeping operations, the amount of fish waste and undesirable particulate matter in the recovered food can be held to extremely low levels. This can be done by sweeping accumulated fish waste and particulate material from the tank immediately before feeding. The water, fish waste and particulate matter thus recovered may be used as fertilizer or otherwise appropriately disposed of. Immediately after that sweeping operation is completed, food is administered to the tank. Any food that is not eaten by the fish will settle rapidly to the bottom of the tank, normally within a period of less than one minute, depending upon the size and density of the food particles. Any food particles that settle to the bottom may be quickly removed by a second sweeping operation, which may be commenced before a substantial amount of fish waste is allowed to accumulate on the bottom of the tank. By conducting the food recovery operation quickly, contamination and bacterial degradation of the recovered food can be held to minimum levels, allowing such food to be recycled and reapplied to fish without danger of disease, pollution or other unhealthful effects. Such food may be recycled by returning it to the same tank from which it was recovered, or by administering it to a different tank of fish. As mentioned above, such recovered food may be dried or otherise processed if desired.

The food recycling procedure described above is simplified by the fact that in commercial fish growing operations, all of the fish in a tank at a given time are normally of the same size and variety. Therefore, they may be fed by food particles of uniform size and settling rate. It may be noted that such food recycling is likely to be more easily accomplished after the fish in a tank grow to a size that may be determined by routine experimentation, for two reasons. First, large fish may be fed less frequently than very small fish. Second, the food particles that are fed to large fish are substantially larger and settle to the bottom of the tank more rapidly than the smaller food particles that are fed to smaller fish. To accommodate this situation, it is possible to refrain from using the food recycling procedure until the fish reach an appropriate size.

The apparatus and procedures described in this invention will greatly enhance the scientific analysis and study of fish feeding and growth. Doctors, sociologists and other scientists have long realized that much valuable information can be obtained about an organism or a society by studying the contents of its effluent; in general, this subject of study is given the Latin phrase *cloaca maxima*, which originally referred to the great sewer of Rome.

By removing and analyzing uneaten food, fish waste and other particulate matter from a fish tank, it is possible to determine the importance of numerous factors that may affect fish feeding and growth, including food composition, feeding rates, population composition and concentration, water temperature and flow rates, aeration, acidity, sunlight, chemical additives or pollutants, etc.

For example, to study the effect of water temperature upon fish populations, other parameters such as food composition, feeding rates and oxygen content of the water could be held constant while the temperature of the water in a given tank is varied. Uneaten food, fish waste and other particulate matter removed from the tank could be analyzed for quantity, composition, or any other variable of interest. Data from control tanks, or from the same tank under control conditions, could be used for comparison. Such studies will provide valuable information about fish in open habitats as well as fish in commercial growing tanks.

EQUIVALENTS

Those skilled in the art will recognize, or be able to determine using no more than routine experimentation, many equivalents to the specific procedures described herein. Such equivalents are considered to be within the scope of this invention and are intended to be covered by the following claims.

I claim:
1. A method for determining the proper amount of food for introduction into a tank of water that contains fish, comprising:
   a. removing food and particulate material from said tank by means of a suction sweeper;
   b. administering a pre-determined amount of food to said water;
   c. allowing sufficient time for food that is not eaten by said fish to settle on the bottom of said tank;
   d. removing settled food from the bottom of said tank by means of a suction sweeper;

e. determining the amount of food that is removed from said tank by said sweeper; and, f. adjusting the amount of food administered to said tank, according to the amount of settled food that is removed by said sweeper.

2. A method for recycling food to growing fish in a tank, comprising:

a. flowing water under substantially laminar conditions through said tank in a generally horizontal direction;

b. administering food to said tank;

c. allowing sufficient time for food that is not eaten by said fish to settle on the bottom of said tank;

d. removing said settled food from the bottom of said tank by moving a sweeper head longitudinally along the bottom of said tank, in either direction, to remove said settled food from the bottom of the tank without significantly interfering with the laminar flow of water in the bulk of said tank; and, e. recycling food removed from the bottom of said tank.

3. In the method of analyzing the effects of various factors upon fish growth including the removal of uneaten fish food and fish waste from the bottom of a fish tank and analyzing said food and waste, the improvement wherein said food and waste are removed from said fish tank by moving a sweeper head longitudinally along the bottom of said tank, in either direction, to thereby remove uneaten food and fish waste from the bottom of said tank.

* * * * *